US007856310B2

(12) United States Patent
Phuyal et al.

(10) Patent No.: US 7,856,310 B2
(45) Date of Patent: Dec. 21, 2010

(54) METHOD OF DEVELOPING TRAFFIC MESSAGES

(75) Inventors: Bishnu Phuyal, Des Plaines, IL (US); Michael Brian Lane, Niles, IL (US); Lawrence M. Peterson, Downers Grove, IL (US); Finn A. Swingley, Chicago, IL (US); William King Sedore, Chicago, IL (US); Victoria Leila Tanzar, Evantson, IL (US); Matthew Richard Zdano, Chicago, IL (US)

(73) Assignee: Navteq North America, LLC, Chicago, IL (US)

( * ) Notice: Subject to any disclaimer, the term of this patent is extended or adjusted under 35 U.S.C. 154(b) by 0 days.

(21) Appl. No.: 12/640,437

(22) Filed: Dec. 17, 2009

(65) Prior Publication Data

US 2010/0094530 A1 Apr. 15, 2010

Related U.S. Application Data

(63) Continuation of application No. 11/600,640, filed on Nov. 16, 2006, now Pat. No. 7,657,367.

(51) Int. Cl.
*G06F 19/00* (2006.01)

(52) U.S. Cl. .................................................... 701/117

(58) Field of Classification Search ......... 701/200–202, 701/117–119, 204
See application file for complete search history.

(56) References Cited

U.S. PATENT DOCUMENTS

| | | | | |
|---|---|---|---|---|
| 5,173,691 | A | 12/1992 | Sumner | 340/905 |
| 6,842,620 | B2 | 1/2005 | Smith et al. | 455/456 |
| 6,879,907 | B2 | 4/2005 | Feldman et al. | 701/117 |
| 6,989,765 | B2 | 1/2006 | Gueziec | 340/905 |
| 7,096,115 | B1 | 8/2006 | Groth et al. | 701/117 |
| 7,526,377 | B2 * | 4/2009 | Wiener et al. | 701/200 |
| 7,657,367 | B1 * | 2/2010 | Phuyal et al. | 701/117 |

* cited by examiner

*Primary Examiner*—Yonel Beaulieu
(74) *Attorney, Agent, or Firm*—Jon D. Shutter; Frank J. Kozak; Lisa M. Schoedel

(57) ABSTRACT

A method is disclosed for developing traffic messages. The method obtains traffic data indicating collected traffic speeds at various locations on a road network. Traffic messages are developed from the traffic data. The method obtains ground truth data indicating ground truth speeds at a subset of the locations on the road network. The ground truth speed represents average speed of vehicles at one of the locations. For those locations for which ground truth speed has been obtained, the method computes a traffic quality value comparing the collected traffic speed to the ground truth speed for the location. The traffic messages and traffic quality data representative of the traffic quality values are transmitted.

17 Claims, 5 Drawing Sheets

METHOD OF DEVELOPING TRAFFIC MESSAGES

REFERENCE TO RELATED APPLICATIONS

The present application is a continuation of application Ser. No. 11/600,640, now U.S. Pat. No. 7,657,367, filed on Nov. 16, 2006, the entire disclosures of which are incorporated by reference herein.

BACKGROUND OF THE INVENTION

The present invention relates to a collecting system and method for providing traffic data to mobile users, such as vehicles traveling on roads, and more particularly, the present invention relates to a system and method that develops traffic messages with quality information.

Traffic information systems provide useful data about roads, including data about traffic congestion, delays, traffic incidents, traffic flow, average vehicle speeds, and so on. Traffic information is used by commercial and non-commercial users, including commuters, fleet operators, emergency service providers, etc.

In some metropolitan areas and countries, systems have been implemented that broadcast data messages that contain up-to-the-minute reports of traffic information. These systems broadcast the data messages on a continuous, periodic, or frequently occurring basis. Receivers installed in vehicles that travel in the region receive the data messages. The receivers decode the data messages and make the information in the messages available to the vehicle drivers.

The traffic data message broadcast systems have several advantages over radio stations simply broadcasting traffic reports. For example, with the traffic data message broadcasting systems, a driver can obtain the traffic information quickly. The driver does not have to wait until the radio station broadcasts a traffic report. Another advantage of the traffic data message broadcast systems is that the driver does not have to listen to descriptions of traffic conditions for areas remote from his or her location. Another advantage of traffic data message broadcast systems is that more detailed and possibly more up-to-date information can be provided. In these types of systems, the data messages conform to one or more pre-established specifications or formats. The in-vehicle receivers decode the traffic data messages using the pre-established specifications or formats.

One system for broadcasting traffic and road condition information is the Radio Data System-Traffic Message Channel ("RDS-TMC"). The RDS-TMC system is used in some European countries. The RDS-TMC system broadcasts messages to vehicles using an FM station data channel. RDS-TMC messages are broadcast regularly or at varying intervals.

There continues to be a need for better traffic information. Traffic information may be collected through a network of traffic sensors, such as embedded roadway sensors, microwave radar sensors and video cameras. Additionally, historic traffic information may be used, along with current events, to predict current traffic information. Collecting and broadcasting traffic information provides advantages. For example, traffic information may be used by vehicles when planning a route. In addition, traffic information may be used to estimate a travel time for a route. However, there are considerations to be addressed when collecting and providing traffic information. One consideration associated with using traffic information relates to quality of the traffic information. That is, whether the traffic information accurately represents reality on the roads.

Accordingly, there is room for improvement when providing traffic information.

SUMMARY OF THE INVENTION

To address these and other objectives, the present invention includes a method for developing traffic messages. The method obtains traffic data indicating collected traffic speeds at various locations on a road network. Traffic messages are developed from the traffic data. The method obtains ground truth data indicating ground truth speeds at a subset of the locations on the road network. The ground truth speed represents average speed of vehicles at one of the locations. For those locations for which ground truth speed has been obtained, the method computes a traffic quality value comparing the collected traffic speed to the ground truth speed for the location. The traffic messages and traffic quality data representative of the traffic quality values are transmitted.

DETAILED DESCRIPTION OF THE PRESENTLY PREFERRED EMBODIMENTS

I. Traffic Information System

Overview

Figure 1:
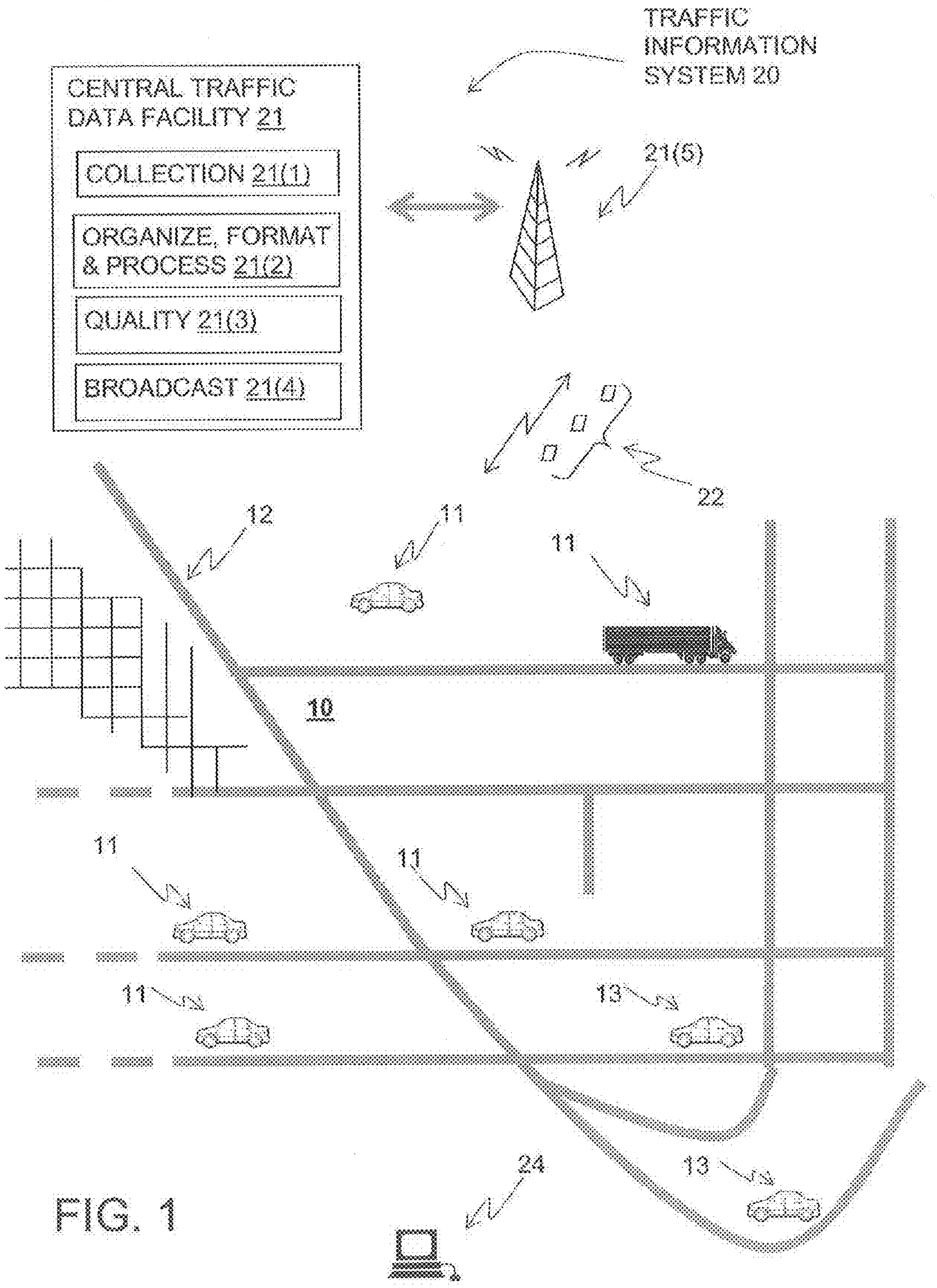
FIG. 1 is an illustration of a geographic area including a road network and a traffic information system.

FIG. 1 is diagram illustrating a geographic region 10. The geographic region 10 may be a metropolitan area, such as the New York metropolitan area, the Los Angeles metropolitan area, or any other metropolitan area. Alternatively, the geographic region 10 may be a state, province, or country, such as California, Illinois, France, England, or Germany. Alternatively, the geographic region 10 can be a combination of one or more metropolitan areas, states, countries and so on. Vehicles 11 travel on a road network 12 in the geographic region 10. The vehicles 11 may include cars, trucks, buses, bicycles, motorcycles, etc.

A traffic information system 20 is located in the geographic region 10. The traffic information system 20 provides for the collection of data relating to traffic and road conditions, the analysis and organization of this collected data, the formatting of the analyzed data into traffic messages, and the transmission of these traffic messages to the vehicles 11 and non-vehicles 24 in the region 10 on a regular and continuing basis.

The traffic information system 20 includes a central traffic data processing facility 21. The central traffic data processing facility 21 may be operated by a government organization or may be privately operated. The central traffic data processing facility 21 includes suitable equipment and programming 21(1) for collecting the data relating to traffic conditions. This equipment and programming 21(1) include, for example, various communications links (including wireless links), receivers, data storage devices, programming that saves the collected data, programming that logs data collection times and locations, and so on.

The central traffic data processing facility 21 includes equipment and programming or software 21(2) for assembling, organizing, processing, analyzing and formatting the collected traffic condition data and equipment and programming 21(3) for accessing quality of the traffic data. This programming and equipment 21(2) and 21(3) include storage devices and programming that organizes the collected data, programming that analyzes the collected data for accuracy and programming that uses the data to prepare messages in one or more appropriate predetermined formats.

The central traffic data processing facility 21 also includes suitable equipment and programming 21(4) for transmitting or broadcasting the data messages. The equipment and programming 21(4) include interfaces to transmitters, programming that communicates formatted messages at regular intervals to the transmitters, and so on. The central traffic data processing facility 21 may also include transmission equipment 21(5). This equipment 21(5) may comprise one or more satellites, FM transmitters, including antennas, towers, or other wireless transmitters. This equipment 21(5) provides for broadcasting or transmitting the formatted traffic and road condition data messages 22 throughout the region 10. The transmission equipment 21(5) may be part of the traffic information system 20, or alternatively, the transmission equipment 21(4) may use other systems, such as cellular or paging systems, satellites, FM radio stations, and so on, to transmit traffic data messages 22 to the vehicles 11 and non-vehicles 24 in the region 10.

There are various types of traffic information systems and traffic message formats. In the embodiment in FIG. 1, the traffic information system 20 conforms to the RDS-TMC system. In the RDS-TMC system, the messages conform to the ALERT-C format. In the RDS-TMC system, many primary and some secondary road interchanges have predefined location numbers or codes. These location numbers are a part of the traffic messages that are broadcast. These location numbers are assigned by the road authorities, map developer, or other parties involved in the development and maintenance of the RDS-TMC system. These location numbers are standardized for all users. That is, any receiver that uses the messages from the traffic broadcast system is required to be able to relate the location reference numbers in the RDS-TMC messages to the known locations to which the numbers are assigned.

In places where these types of location numbers are assigned, the location reference numbers may be unique within a regional database of the specific traffic broadcast system. Such a regional database is known as a location table. A separate location table is defined for each different region. This location table region may correspond to the region 10 in FIG. 1.

Figure 2:
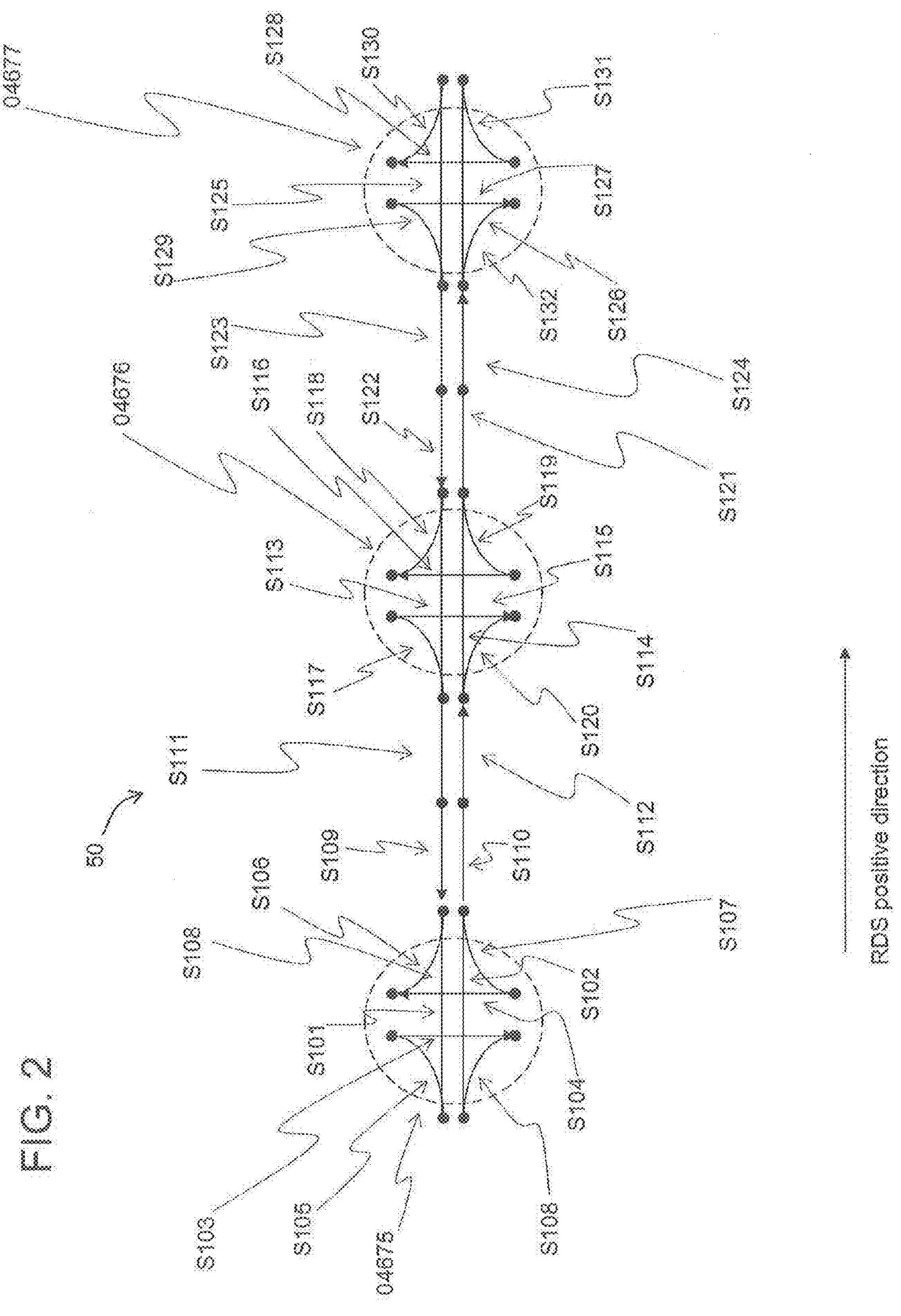
FIG. 2 shows location reference codes used by the traffic information system in FIG. 1.

FIG. 2 shows one example of location reference numbers. The example of a location referencing system in FIG. 2 is similar or identical to the RDS-TMC system. FIG. 2 illustrates a portion of a roadway 50. This roadway 50 is one of the roadways in the roadway network 12 (in FIG. 1) about which the traffic information system 20 monitors traffic and about which the traffic information system 20 reports on traffic congestion conditions by means of traffic messages 22.

Referring to FIG. 2, in order to identify locations along the roadway 50 to which the traffic message pertains, location reference numbers (e.g., 04675, 04676, and 04677) are assigned to locations along the roadway 50. These location reference numbers are pre-assigned by the road authorities or others involved with the traffic information system 20. The messages 22 (in FIG. 1) broadcast by the traffic information system 20 include these location reference numbers when identifying locations of traffic flow.

In current traffic information systems, the roads about which traffic messages are transmitted are major roads, such as expressways or major arterial roads. In current traffic information systems, traffic data along minor roads is not collected or reported. In the future, traffic information systems may collect and report traffic data for minor roads, as well as major roads. Accordingly, in systems, such as the traffic information system 20 in FIG. 1, location reference numbers are assigned to locations along expressways, major arterial roads, and minor roads.

FIG. 2 shows only three location numbers, 04675, 04676, and 04677 and numerous road segments S101-S132. It is understood that in a typical traffic broadcast system, there may be hundreds, thousands, or more, of location reference numbers assigned to locations along roads in each region represented by a location table. As shown in FIG. 2, the location reference numbers correspond to interchanges along the roadway 50. However, location reference numbers may be assigned to any position along the roadway 50, including positions between interchanges.

In the location referencing system in FIG. 2, directions may be defined as positive or negative. For example, in the RDS-TMC system, the direction is positive for travel directions west to east and from south to north. The location reference numbers may be, but are not necessarily, assigned in consecutive order along a roadway.

In the location referencing system in FIG. 2, each roadway is assigned its own location reference numbers. The location reference numbers of one roadway are not shared with other roadways. Therefore, at an interchange between two roadways each of which is assigned location reference numbers, one location reference number is assigned to the interchange for the first of the roadways and a second different location reference number is assigned to the same interchange for the second of the roadways. Thus, a single interchange may have more than one location reference numbers assigned to it, one for each of the roadways that meet at the interchange.

Figure 3:
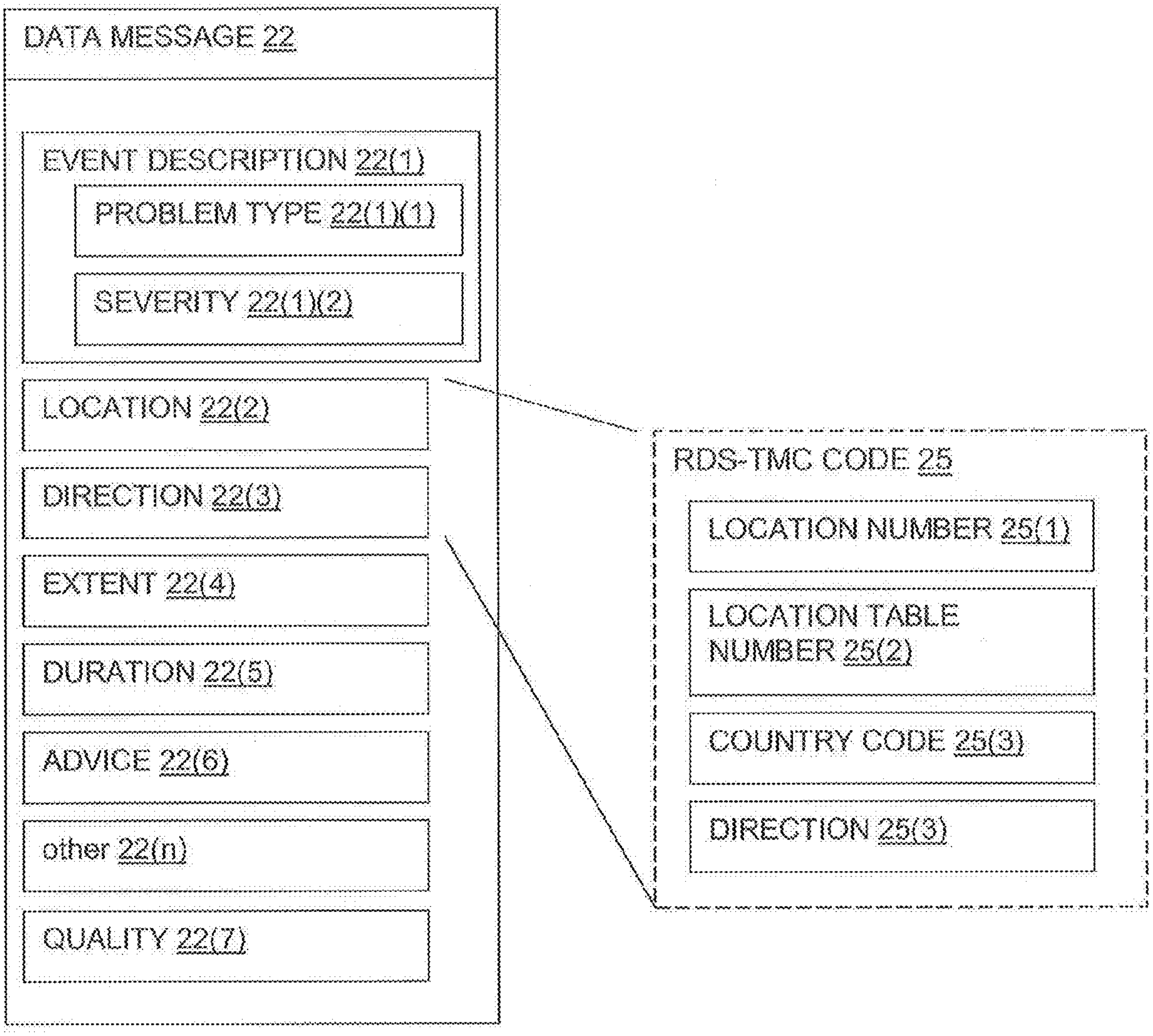
FIG. 3 is a block diagram showing components of the traffic message shown in FIG. 1.

FIG. 3 illustrates the data components of one of the traffic messages 22. The traffic message 22 can include various kinds of information. In FIG. 3, the traffic message 22 includes data components that identify one or more locations along a road, what the traffic conditions are at these locations, and how far the identified traffic condition extends.

In the embodiment shown in FIG. 3, the traffic message 22 includes the following data components: an event description 22(1), a location 22(2), a direction 22(3), an extent 22(4), a duration 22(5) and advice 22(6). In alternative embodiments, the traffic message 22 may also include components that provide other information 22(*n*).

The event description component 22(1) includes data that describe a traffic problem 22(1)(1) along with data that describe a level of severity 22(1)(2) of the traffic problem 22(1)(1). The location component 22(2) includes a reference number that identifies the location (e.g., a primary location) of the traffic problem 22(1)(1). The direction component 22(3) includes data that indicate the direction of traffic affected. The extent component 22(4) includes data that identify a length of a traffic congestion queue with respect to the location 22(2). The extent component 22(4) implicitly defines another location (e.g., a secondary location) straddling the traffic condition in terms of the number of location references in between. The advice component 22(6) provides a recommendation for a diversion of route.

According to one embodiment, the traffic message 22 conforms to the standard format for ALERT-C messages established in the RDS-TMC system. For example, in the RDS-TMC system, the location 22(2) portion of the message 22 includes a RDS-TMC code 25. The RDS-TMC code 25 includes a location number 25(1), a location table number 25(2), a country code 25(3), and a direction 25(4). The location number 25(1) is a unique number within a region to which one location table (i.e., a database of numbers) corresponds. The location table number 25(2) is a unique number assigned to each separate location table. The country code 25(3) is a number that identifies the country in which the location referenced by the location number 25(1) is located. The direction 25(4) takes into account factors such as direction affected by the incident, bi-directionality and whether or not the segments are external to the junction. The RDS-TMC code 25 is published in the message 22 in a string as follows:

ABCCDEEEEE where:

A: Direction of the road segment (=direction 25(4))

B: Country code (=country code 25(3))

CC: Location database number (=location table number 25(2))

D: RDS direction (+, –, P, N) (=direction 25(4))

EEEEE: Location code (=location number 25(1))

By convention, the location portion 22(2) of a message 22 specifies the location at which a traffic queue begins. This location may be referred to as the primary location or the head. The message 22 also indicates a secondary location or tail. The message 22 indicates the secondary location indirectly, i.e., by means of the direction and extent 22(4). The extent 22(4) indicates how many location codes from the primary location are affected at the level of severity (i.e., 22(1)(2)) indicated in the message.

Location codes refer to specific locations that are spaced apart from each other along a road. Therefore, when using location codes to specify a primary location (i.e., the location at which traffic congestion begins), the exact location at which traffic congestion begins may be between the locations to which location codes are assigned. In this case, by convention, the location code assigned to the location immediately beyond the traffic incident or upstream is used to specify the primary location.

Some of the vehicles 11 and non-vehicles 24 (in FIG. 1) include suitable equipment that enables them to receive the traffic messages 22 transmitted by the traffic information system 20. The data in these traffic messages may be used in the vehicle in various ways. For example, the information may be presented to the vehicle driver. Alternatively, the information in these traffic messages may be used in conjunction with a navigation system, as described in U.S. Pat. No. 6,438,561.

II. Quality Analysis of Traffic Data

A. Collecting Traffic Data

The central traffic data processing facility 21 collects traffic data from a variety of sources. In one embodiment, the traffic data represents traffic flow on the road network 12. Generally, the traffic data that represents traffic flow indicate traffic speed associated with certain locations on the road network 12. In one embodiment, the central traffic data processing facility 21 receives traffic data from a commercial traffic supplier representing traffic speeds in a format illustrated in Table I or other formats. In other embodiment, the central traffic data processing facility 21 may receive traffic data representing traffic flow on the road network from a road authority, such as the Illinois Department of Transportation or other such organization.

TABLE I

| Location | Direction | Speed | Time |
|---|---|---|---|
| 04678 | Positive | 50 | 2:00 |
| 04699 | Negative | 35 | 2:00 |
| 04740 | Positive | 40 | 2:00 |
| 04844 | Negative | 50 | 2:00 |

As shown in Table I, the data indicating traffic speeds provides a location reference code identifying traffic locations. Location reference numbers refer to specific locations that are spaced apart from each other along the road network. In one embodiment, the location reference numbers correspond to assigned locations along roads in the region represented by a location table. The data indicating traffic speeds also provides a direction of traffic flow as either "Positive" or "Negative." The positive direction refers to a predetermined direction along a road specified by a positive offset and specified by the next traffic location code on the road. Typically, the positive direction is from west to east and from south to north. The negative direction refers to a predetermined direction along a road specified by a negative offset and specified by the previous traffic location code on the road. Typically, the negative direction is from east to west and from north to south. As shown in Table I, the data includes traffic speeds for the locations on the road network identified by the location reference numbers. Additionally, the data includes a time representing the approximate time at which the traffic flow was captured. The central traffic data processing facility 21 receives the traffic data at regular intervals, such as every five minutes.

The central traffic data processing facility 21 may also receive traffic data representing traffic flow on the road network from sensors located in, near or above locations along the road network. The sensors may include equipment and programming, such as various communications links (including wireless links), receivers, data storage devices, programming that save the collected data, programming that logs data collection times and locations, programming that processes and analyzes the data to determine traffic speeds and so on. In one embodiment, the sensors collect data regarding traffic speeds at certain locations along the road network. The sensors may include vehicle counting devices, video cameras, microwave radar sensors, embedded roadway sensors and any other sensor. In one embodiment, the central traffic data processing facility 21 receives the traffic data from the sensors in a format similar to that illustrated in Table I or other formats.

The central traffic data processing facility 21 may also receive traffic data from probe vehicles traveling along the road network. In this embodiment, some of the vehicles 11 include suitable equipment that enables them to act as probe vehicles for traffic data collection. A probe vehicle refers to a vehicle that is used for collecting traffic data while being driven on roads for other purposes unrelated to traffic data collection. For example, a probe vehicle may be a vehicle owned by a private individual who uses the vehicle for commuting to work or for leisure activities. Probe vehicles may also include vehicles that are part of a fleet of commercial vehicles, such as delivery trucks that are used to deliver packages. Probe vehicle may also include vehicles used for public transportation, such as buses and taxis. A member of the public may operate the probe vehicle or alternatively a commercial enterprise or government entity may operate the probe vehicle. Each of the probe vehicles may include a computing platform, such as a cellular phone or navigation system, that wirelessly communicate with the central traffic data processing facility 21 to provide data indicating a current location of the vehicle. The probe vehicles may also provide data indicating speed and direction of the vehicle as well as time and other data. The central traffic data processing facility 21 analyzes the location data from each of the probe vehicles to determine the location and average speed. Analyzing data from numerous probe vehicles traveling the road network provides an indication of traffic flow on the road network. In one embodiment, the central traffic data processing facility 21 analyzes the location data from numerous probe vehicles and generates average traffic speed at locations represented by location reference codes to provide the traffic data in a format similar to that illustrated in Table I or other formats.

The central traffic data processing facility 21 may also obtain traffic data representing traffic flow on the road network from historical data. Historical data provides travel speeds for locations along the road network at various time intervals based on past traffic patterns. Historical data may be based on analysis of traffic data collected over time. The analysis of the traffic data collected over time may illustrate repeating patterns of travel speeds at certain times of the day and days of the week for certain road segments. For example, on weekdays between 7 A.M. and 9 A.M., a certain location on the road network experience moderate congestion and a traffic speed of 40. Furthermore, the central facility 21 may use a predictive model to estimate likely traffic flow at various times and under various events, e.g. after a sporting event or during a rainstorm. In one embodiment, the historic data and/or predictive model provide traffic data in a format similar to that illustrated in Table I or other formats.

The central traffic data processing facility 21 receives the traffic data from the variety of sources through a variety of communication links including wireless communication links, direct communication links, and the Internet. The central traffic data processing facility 21 receives the traffic and road condition data from the variety of sources at various time intervals. For example, the central traffic data processing facility 21 may automatically receive data every five minutes or any other interval from different sources. Additionally, the central traffic data processing facility 21 may request traffic data from the sources when needed. In one embodiment, the central traffic data processing facility 21 time and date stamps all received data records from each of the sources.

Because the central traffic data processing facility 21 may collect traffic data representing traffic flow on the road network from a variety of sources, the traffic data may be in a variety of formats. Accordingly, the central traffic data processing facility 21 converts the format of the collected data into a unified format. In one embodiment, the unified format is as shown in Table I with a traffic speed identified for specified locations on the road network identified with the location reference numbers and direction.

B. Collect Ground Truth Speed Data

The traffic information system 20 in FIG. 1 collects ground truth speed information. Ground truth speed information represents the actual current traffic flow experienced at a location on the road traveled by a vehicle. In one embodiment, the ground truth speed information is the average speed of vehicles at a location on the road or a section of the road.

The central traffic data processing facility 21 collects ground truth speed data using designated ground truth vehicles 13. In one embodiment, the central traffic data processing facility 21 obtains data from enough ground truth vehicles 13 provide a sample of the actual current traffic conditions on the road network 12. For example, a group of approximately twenty ground truth vehicles may be dispersed along the major roads in the geographic region 10. These ground truth vehicles may include vehicles which are owned (or leased) by the operator of the traffic information system 20 or by other private parties or commercial entities, as well as fleet vehicles. The ground truth vehicle replicates the average traffic flow conditions for its location on the road network. In one embodiment, the driver of the ground truth vehicle allows as many vehicles to pass as vehicles he or she has passed.

Each ground truth vehicle 13 is equipped with the necessary hardware, software and data in order to provide ground truth speed data. The ground truth vehicle 13 includes a positioning system. The positioning system may utilize GPS technology, a dead reckoning-type system, or combinations of these or other systems, all of which are known in the art. The positioning system may include suitable sensing devices that measure the traveling distance speed, direction, and so on, of the vehicle and appropriate technology to obtain a GPS signal, in a manner which is known in the art. The ground truth vehicle also includes a wireless data transmitter. The wireless data transmitter is capable of sending data messages to the central traffic data facility 21 over a data communications network, at least a part of which is a wireless communications network. The wireless data transmitter may utilize any suitable technology for sending messages, such as cellular, satellite, Wimax, DSRC, etc.

As each of the ground truth vehicles moves on the road network (or is stopped), the ground truth vehicle collects data representative of the ground truth speed on the road and provides the data to the central traffic data processing facility 21. In one embodiment, the ground truth vehicle 13 transmits vehicle identification and position data to the central traffic data processing facility 21 at frequent intervals, such as every 10 seconds. Alternatively, the ground truth vehicle 13 may obtain data that indicates the vehicle position from the positioning system and temporarily store the position data for subsequent transmission to the central traffic data processing facility 21 at periodic intervals such as every 5 minutes. The vehicle position may be expressed in any suitable manner, such as geographic coordinates (e.g., latitude and longitude) with a time stamp. In addition to providing vehicle position, the ground truth vehicle may also provide vehicle speed and direction.

In an alternative embodiments, the central traffic processing facility 21 collects ground truth speed data from other sources. The other sources of ground truth information may include probe vehicles and sensors located in, near or above locations along the road network such as vehicle counting devices, video cameras, microwave radar sensors, embedded roadway sensors and any other sensor.

C. Quality Analysis

Figure 4:
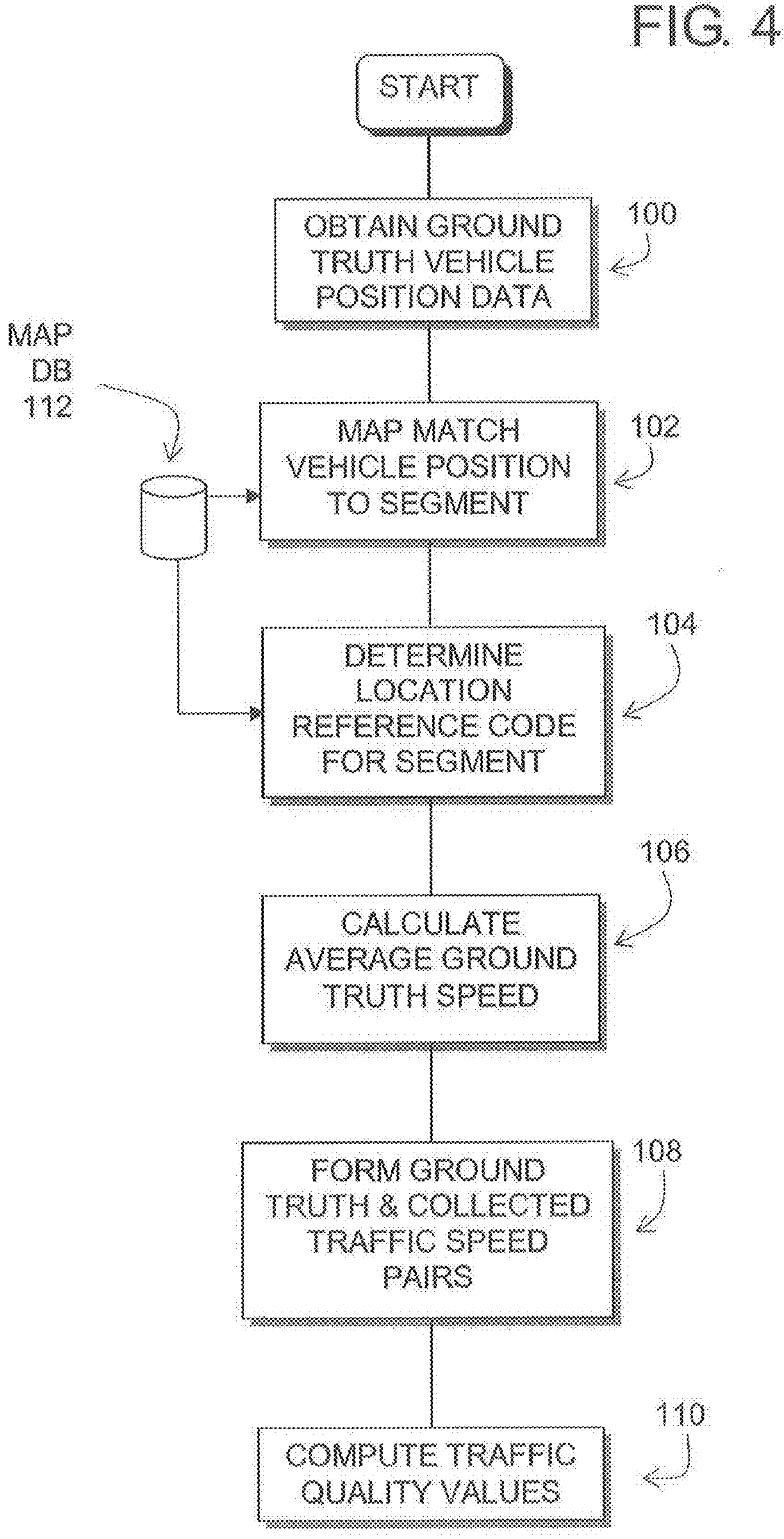
FIG. 4 is a flowchart showing steps in a process performed by the traffic information system to determine traffic information quality.

FIG. 4 shows a flow chart of a process performed by the central traffic data processing facility 21 to evaluate the quality of the collected traffic data representing traffic flow. A computing platform at the central traffic data processing facility 21 implements a quality analysis application to perform the steps of FIG. 4. In an initial step, the central traffic data processing facility 21 obtains data indicating vehicle position with a time stamp and vehicle identification of the ground truth vehicles for a specified epoch of time (Step 100). The data are stored temporarily in an appropriate storage device at the central traffic data processing facility 21. In one embodiment, the quality analysis application obtains position data of the ground truth vehicles corresponding to a five minute interval of time, such as the last five minutes from a current time.

Figure 5:
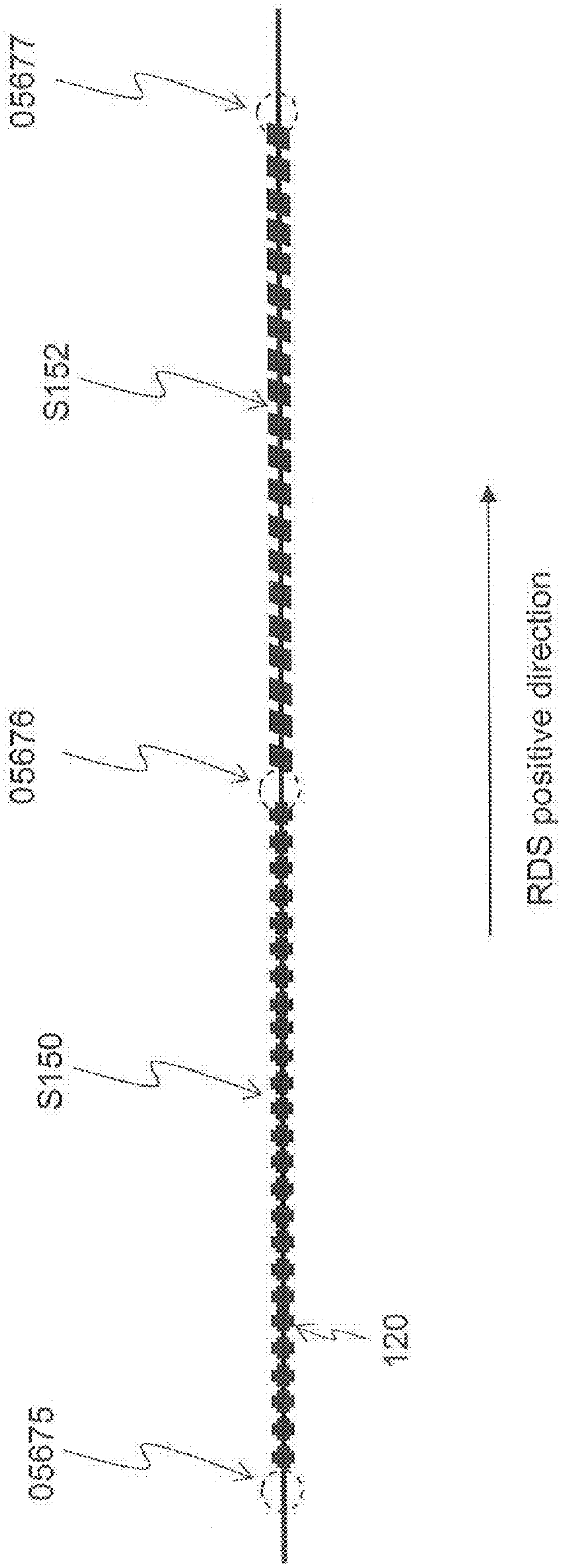
FIG. 5 is an illustration of a road with position information from a ground truth vehicle matched to the road.

Next, central traffic data processing facility 21 uses the position data from the ground truth vehicles to determine the road segments on which the vehicles have traveled (Step 102). The quality analysis application uses a geographic database 112 for this map matching purpose. FIG. 5 illustrates the position data 120, comprising latitude and longitude coordinates from a single ground truth vehicle, matched onto road segments S150 and S152. When determining the road segments on which each of the ground truth vehicles has traveled, the direction of travel along the road segment is also determined.

Then, for each of the ground truth vehicles, the quality analysis application determines which location reference numbers or codes representing predetermined locations, if any, correspond to the road segments and direction that the ground truth vehicle has traveled (Step 104). As mentioned above in connection with FIG. 2, location reference numbers may not be assigned for all the roads in a geographic region. Thus, if the ground truth vehicle is on a road along which location reference numbers have not been assigned, there is no location reference number to determine. On the other hand, if the vehicle is on a road along which location reference numbers have been assigned, the quality analysis application determines the location reference numbers that correspond to the vehicle's position and direction.

In one embodiment, the quality analysis application assigns the map matched position data to the location reference numbers as shown in FIG. 5. The map matched position data, indicated with cross shaped points, after the location corresponding to the location reference code number 05675 and up to the location corresponding to the location reference number 05676 are assigned to the location reference number 05676. Additionally, the map matched position data, indicated with parallelogram shaped points, after the location corresponding to the location reference number 05676 and up to the location corresponding to the location reference number 05677 are assigned to the location reference number 05677. In alternative embodiments, a portion of the map matched position data on either side of the location corresponding to the location reference number may be assigned to the respective location reference number.

Next, the quality analysis application determines an average speed of the ground truth vehicle at the location corresponding to location reference number for which the map matched position data has been assigned (Step 106). One way to perform this step is to evaluate the change in position of the ground truth vehicle over a predetermined time interval. Consecutive positions of the vehicle are evaluated to determine the speed of the vehicle between those locations. For example, the speed is obtained by computing the distance between consecutive positions using the latitude and longitude coordinates and dividing the computed distance by the time elapsed between these positions using their associated time stamps. A mean of all of the calculated speeds between consecutive positions is then computed to find an average speed value of the ground truth vehicle for the road leading up to the location corresponding to the location reference code. In alternative embodiments, the average speed may be calculated differently, such as by comparing the distance between the farthest position from and the closest position to the location of the location reference code and dividing by the time elapsed. Additionally, the average speed may be determined by computing the mean of ground truth vehicle provided speed values.

Once the average ground truth vehicle speed is determined, the quality analysis application forms ground truth and collected traffic data speed pairs for the matching traffic locations during the time epoch (Step 108). For each of the locations for which the average ground truth vehicle speed has been obtained, the quality analysis application obtains the traffic speed value provided by the collected traffic data. Now, the quality analysis application has sample pairs consisting of ground truth average speed and collected traffic speed for the sample locations on the road network 12 represented by the location reference numbers.

Then, the quality analysis application computes traffic quality values using the ground truth average speed and collected traffic speed pairs (Step 110). The quality measures for traffic flow data will be discussed in detail below. This process repeats at periodic time intervals to continually obtain sample measurements of traffic quality.

Computing traffic quality values provides advantages for the traffic information system 20. The traffic quality values express a degree of reliability of the collected traffic flow data. Additionally, the traffic quality values allow a determination of travel time reliability, such as an upper and lower bounds of the calculated travel time and travel time confidence. Comparing the speed values from the collected traffic flow data to the ground truth speed values identifies differences between reality on the road network and traffic information provided by traffic sensors or other sources.

In one embodiment, the central traffic data processing facility 21 computes traffic quality values representing the difference between the speed values from ground truth and collected traffic data pairs for the same epoch. That is, the difference in the speed values is computed for each traffic location associated with a ground truth and collected traffic data pair. Additionally, the maximum, minimum and mean speed difference for road network of the geographic region 10 or a portion of the road network, such as a portion of a highway, may be computed. These speed difference values provide an indication of the quality of the collected traffic data. Namely, the speed difference values provide a sample of how the actual speed at locations on the road network compares to speeds reported by the traffic data sources.

In another embodiment, the central traffic data processing facility 21 computes traffic quality values that express quality in terms of both speed and travel time. Speed and travel time are functionally related as expressed below, $$D=ST \tag{1}$$

where D is distance, S is speed and T is travel time. By differentiating Equation 1 and keeping distance constant, the following relationship between speed and travel time is obtained $$\frac{dS}{S} = -\frac{dT}{T} \tag{2}$$

where dS is delta speed or difference between ground truth speed value and collect traffic speed value and dT is delta time or difference in time.

In Equation 2, the left hand side (dS/S) is called a speed error ratio and the right hand side (dT/T) is called a travel time error ratio. The magnitude of the speed error ratio and the travel time error ratio are numerically equal and valid for any distance (D). The negative sign shows that a positive speed error causes shorter travel time and a negative speed error causes a larger travel time. Multiplying both sides of Equation 2 by 100 provides a percentage of speed error and a percentage of travel time error. Subtracting the absolute value of the percentage of speed error from 100 provides a percentage of speed accuracy, and subtracting the absolute value of the percentage of travel time error from 100 provides a percentage of travel time accuracy.

The speed error ratio, travel time error ratio, percentage of speed error, percentage of travel time error, percentage of speed accuracy, and percentage of travel time accuracy are traffic quality values. The central traffic data processing facility 21 computes some or all of the traffic quality values for each of the ground truth and collected traffic speed pairs. The speed error ratio is computed as the difference between the ground truth speed value and the collected traffic speed value divided by the ground truth speed value. For example, if the ground truth average speed is 50 and the collected traffic speed is 45, the central traffic data processing facility 21 computes the speed error ratio as 0.1 ((50−45)/50). Accordingly, the travel time error ratio is −0.1, percentage of speed error is 10%, percentage of travel time error is −10%, percentage of speed accuracy is 90%, and percentage of travel time accuracy is 90%.

In alternative embodiments, the central traffic data processing facility 21 computes other traffic quality values. Other traffic quality values may express a comparison of ground truth traffic information to collected traffic information.

D. Applications for the Traffic Quality Values a. Evaluate Collected Traffic Data Sources In one embodiment, the central traffic data processing facility 21 uses the traffic quality values to evaluate the variety of sources of the collected traffic data. If traffic data is obtained from commercial traffic suppliers or road authorities, the central traffic data processing facility 21 uses the traffic quality values to assess the quality of the traffic data provided by the commercial traffic suppliers or road authorities. The central facility 21 may evaluate all of the traffic flow data from the specified supplier together or evaluate portions of the traffic flow data from the supplier, such as specific cities or specific roads. To evaluate a specified supplier, the central facility 21 computes the speed error ratio for each ground truth and collected traffic speed pairs developed with traffic flow data from the specified supplier of interest. The maximum and minimum error speed ratios along with the mean of the absolute value of the error speed ratios are computed.

Using these statistics, the central traffic data processing facility 21 determines the reliability of the traffic flow data from the specified supplier. If the mean of the absolute value of the error speed ratios is greater than a predetermined amount, such as 0.25, the central traffic data processing facility 21 judges the supplier as unreliable. If the supplier is judged as unreliable, the central traffic data processing facility 21 may reject the traffic data from the unreliable supplier and use traffic data from other suppliers to develop the traffic messages. Additionally, the central facility 21 may send feedback to the unreliable supplier indicating that the traffic flow data lacks sufficient quality. Moreover, the central facility 21 may flag the supplier as having low quality and will use the traffic flow data from the unreliable supplier only when data is not available from a more reliable source. Furthermore, the central facility 21 may use the quality information to prioritize traffic messages with higher quality before traffic messages with lower quality.

In another embodiment, the central traffic data processing facility 21 uses the traffic quality values to evaluate the performance of traffic sensors that provide traffic flow data. For example, the speed error ratio is calculated for a location with a ground truth and collected traffic speed pair developed with traffic flow data from a specified traffic sensor. If the absolute value of the error speed ratio is greater than a predetermined amount, such as 0.25, the central traffic data processing facility 21 judges the traffic sensor to be unreliable. If the sensor is judged as unreliable, the central traffic data processing facility 21 may reject the traffic data from the sensor and use traffic data from other sources for the location of the unreliable sensor to develop the traffic messages. Additionally, the facility 21 may send a notice that the sensor requires maintenance or calibration. Moreover, the facility 21 may flag the sensor as having low quality and will use the traffic data from the unreliable sensor only when data is not available from a more reliable source.

In another embodiment, the central traffic data processing facility 21 uses the traffic quality values to evaluate the performance of traffic data from historic and/or predictive models. For example, the speed error ratio is calculated for locations with ground truth and collected traffic speed pair developed with traffic flow data from a historic and/or predictive model. If the mean of the absolute value of the error speed ratios is greater than a predetermined amount, such as 0.25, the central traffic data processing facility 21 judges the historic and/or predictive model as unreliable. If the historic and/or predictive model is judged as unreliable, the central traffic data processing facility 21 may use additional traffic data to obtain more accurate historic traffic data. This can be done also using traffic data from other sources. Additionally, the central facility 21 may use the traffic quality values and ground truth speed values to modify and improve the historic and/or predictive model. Moreover, the central facility 21 may use the traffic data from the unreliable historic and/or predictive model only when data is not available from a more reliable source.

b. Include Traffic Quality Values in Traffic Message Delivery

In another embodiment, the central traffic data processing facility 21 includes the traffic quality values in a traffic message delivery. The central traffic processing facility 21 may transmit generated traffic messages at fixed intervals to another party for broadcast or use. For example, the central traffic data processing facility 21 transmits traffic messages 22 for the geographic region 10 every five minutes to a satellite radio service for broadcast and to a navigation services server of an internet travel planning company. In one embodiment, the central facility 21 transmits the traffic messages 22 with a streaming data feed comprised of packets of messages. The traffic quality values for the corresponding time epoch may be included in the data feed with the traffic messages. The traffic quality values may be included in header messages. The central facility may include the maximum, minimum and/or mean of the absolute value of any of the traffic quality values for the entire geographic region or a portion thereof in the traffic data feed.

The third party receives the streaming data feed with the traffic messages and traffic quality values. The third party may evaluate the traffic quality values to determine whether the traffic messages are reliable. For example, the third party may reject the traffic messages if the traffic quality values do not meet their minimum predetermined level. Additionally, the third party may broadcast the traffic quality values as traffic quality messages along with the traffic messages. Furthermore, the internet travel planning company may display the traffic quality values on a website.

c. Include Traffic Quality Value in Traffic Message

In an alternative embodiment, the central traffic data processing facility 21 incorporates a traffic quality value or values into the traffic messages 22. As discussed above and shown in FIG. 3, the traffic messages 22 includes the following data components: event description 22(1), location 22(2), direction 22(3), extent 22(4), duration 22(5) and advice 22(6). Additionally, in the present embodiment, the traffic message includes quality information 22(7). The quality data component 22(7) comprises one of the quality data values or a code representative of one of the quality values relevant to the location 22(2). For example, the quality data component 22(7) includes a value representing the percentage of travel time accuracy for respective traffic locations in the traffic message 22.

In one embodiment, the quality values included in the quality data component 22(7) correspond to the geographic region 10 that encompasses the respective traffic locations in the traffic message 22. For example, the quality data component comprises the mean of the percentage of travel time accuracy developed from the ground truth and collected traffic speed pairs for locations in the geographic region. Alternatively, the quality values in the quality component 22(7) may correspond to a portion of the geographic region 10 that encompasses the respective traffic locations in the traffic message 22. Additionally, in some cases one of the ground truth vehicles may have traveled a road segment represented by one of the traffic location codes included in the traffic message. In this case, the central traffic data processing facility 21 has a traffic quality value that corresponds directly one of the locations in traffic message and includes this quality value in the quality component 22(7).

d. Use Traffic Quality Value in Travel Estimates

In one embodiment, the end user computing platform that receive the traffic messages 22 uses the quality data component 22(7) of relevant traffic messages 22 when performing travel estimates. As stated above, some of the vehicles 11 (in FIG. 1) have appropriate equipment that can receive the traffic messages 22. The data in these traffic messages may be used in the vehicle in various ways. For example, the traffic quality information may be presented to the vehicle driver. Alternatively, the traffic quality information in the traffic messages may be used in conjunction with a navigation system. The navigation system may be a stand-alone system located in the vehicle 11 and/or non-vehicle 24. Additionally, the navigation system may comprise a computing platform located in the vehicle 11 and/or non-vehicle 24 that communicate with a navigation services server.

The navigation system provides various types of navigation-related services. One of the navigation-related services is route calculation. Given a starting location and a destination location, route calculation determines a solution route comprising a series of connected segments over which the end user can travel from the starting location to reach the destination location. The navigation system uses the solution route to estimate an expected trip time to travel from the starting location to the destination location. The navigation system computes the trip time estimate considering the travel distance and expected speed. In one embodiment, the navigation system consults the geographic database to determine the length of each of the solution route road segments and expected travel speed on those road segments to compute the trip time estimate.

When computing the estimated travel time, the navigation system may further determine whether any of the traffic messages 22 relate to the road segments of the solution route. If one or more of the traffic messages relate to locations along the road segments of the solution route, the navigation system uses the event description component 22(1), such as current traffic speed information, to determine the expected speed along the road segments. Using the information in the traffic message, the navigation system computes the estimated trip time considering current traffic conditions.

Furthermore, the navigation system may use the quality data component 22(7) of the traffic message to compute an upper and lower bound for the estimated trip time. For example, if the navigation system computes the trip time as 60 minutes and the quality data component 22(7) indicates that the travel time percentage error is 15%, the upper and lower bounds of the trip time is 60 minutes plus or minus 9 minutes, or between 51 and 69 minutes. The upper and lower bounds of the trip time may be presented to the vehicle driver or user of the computing platform.

In an alternative embodiment, the navigation system may consider the upper and lower bounds of the trip time estimates when considering and recommending alternative routes.

It is intended that the foregoing detailed description be regarded as illustrative rather than limiting and that it is understood that the following claims including all equivalents are intended to define the scope of the invention.

We claim:

1. A computer implemented method of operating a navigation system, the method comprising:

receiving a plurality of traffic messages, wherein the traffic message provides data indicating a traffic condition on a road network in a geographic region, said traffic message comprises a location reference code indicating a location on the road network of said traffic condition, an event code of said traffic condition, and a traffic quality code, wherein said traffic quality code represents a comparison of a collected traffic speed to a ground truth speed; and using the traffic quality code of the traffic messages to provide navigation-related services on the navigation system.

2. The method of claim 1 further comprising the step of displaying traffic quality data represented by the traffic quality code to a user of said traffic message to indicate reliability of the traffic information.

3. The method of claim 1 further comprising:

using traffic quality data represented by the traffic quality code to compute an upper bound and a lower bound of a trip travel time.

4. The method of claim 1 wherein said traffic quality code represents a travel time error ratio.

5. The method of claim 1 wherein the traffic quality code represents a speed error ratio.

6. The method of claim 5 wherein said speed error ratio is computed as a difference between a ground truth speed and a collected traffic speed divided by the ground truth speed.

7. A computer implemented method of operating a navigation system, the method comprising:

receiving a plurality of traffic messages that provides data indicating traffic conditions on a road network in a geographic region, said traffic message comprises data indicating a location on the road network of said traffic condition, data indicating a type of said traffic condition, and data indicating a traffic quality value; and using the data indicating the traffic quality value when computing an estimated travel time for a route, wherein the traffic quality value is used to compute an upper bound and a lower bound of the estimated travel time.

8. The method of claim 7 wherein the traffic quality rating represents a comparison of a collected traffic speed to a ground truth speed for a location.

9. The method of claim 7 wherein the traffic quality value is a speed error ratio computed as a difference between said ground truth speed and said collected traffic speed divided by said ground truth speed.

10. The method of claim 7 wherein the traffic quality value is a travel time error ratio.

11. A computer implemented method of operating a navigation system, the method comprising:

receiving a plurality of traffic messages that provides data indicating traffic conditions on a road network in a geographic region, said traffic message comprises data indicating a location on the road network of said traffic condition, data indicating a type of said traffic condition, and data indicating a traffic quality value;

using the data indicating the traffic quality value when computing an estimated travel time for a route; and if said traffic quality value is less than a predetermined level, rejecting the traffic message.

12. The method of claim 8 wherein said ground truth speed is obtained from a ground truth vehicle.

13. The method of claim 8 wherein said collected traffic speed is obtained from a sensor.

14. The method of claim 8 wherein said collected traffic speed is obtained from a historic traffic model.

15. A navigation system comprising:

a computer; and a receiver for receiving a plurality of traffic messages, the traffic message comprises a location code indicating a location on the road network of said traffic condition, an event code indicating a type of said traffic condition, and a traffic quality code indicating a quality value associated with the traffic message, wherein the quality value represents a comparison of a collected traffic speed to a ground truth speed for the location.

16. The navigation system of claim 15 wherein the quality value is a speed error ratio computed as a difference between said ground truth speed and said collected traffic speed divided by said ground truth speed.

17. A navigation system comprising:

a computer; and a receiver for receiving a plurality of traffic messages, the traffic message comprises a location code indicating a location on the road network of said traffic condition, an event code indicating a type of said traffic condition, and a traffic quality code indicating a quality value associated with the traffic message, wherein the quality values represents a travel time error ratio.

* * * * *